United States Patent
Takai (10) Patent No.: US 6,698,570 B2
(45) Date of Patent: Mar. 2, 2004

(54) OBJECT CONVEYING DEVICE

(75) Inventor: Kiyoshi Takai, Shizuoka (JP)

(73) Assignee: Sony Disc Technology Inc. (JP)

( * ) Notice: Subject to any disclaimer, the term of this patent is extended or adjusted under 35 U.S.C. 154(b) by 0 days.

(21) Appl. No.: 10/134,788

(22) Filed: Apr. 30, 2002

(65) Prior Publication Data

US 2002/0195311 A1 Dec. 26, 2002

(30) Foreign Application Priority Data

May 17, 2001 (JP) .................................... P2001-147397

(51) Int. Cl.⁷ ........................... B65G 15/64; B65G 21/22
(52) U.S. Cl. ................ 198/345.1; 425/150; 425/192 R; 425/190
(58) Field of Search ............................... 428/426, 64.4; 425/556, 810, 546, 812, 451.7, 595, 150, 192 R, 590, 553, 190; 198/345.1

(56) References Cited

U.S. PATENT DOCUMENTS

| | | | | |
|---|---|---|---|---|
| 5,297,951 A | * | 3/1994 | Asai | 425/556 |
| 5,599,564 A | * | 2/1997 | Ishihara et al. | 425/190 |
| 5,626,885 A | * | 5/1997 | Vromans | 425/110 |
| 6,056,530 A | * | 5/2000 | Van Hout | 425/150 |
| 6,530,766 B1 | * | 3/2003 | De Graaff | 425/150 |

FOREIGN PATENT DOCUMENTS

| | | |
|---|---|---|
| EP | 0 876 901 A1 | 11/1998 |
| GB | 2 287 210 | 9/1995 |
| JP | 2001-179776 | 7/2001 |

OTHER PUBLICATIONS

EPO Search Report dated Mar. 19, 2003.

* cited by examiner

*Primary Examiner*—Richard Ridley
(74) *Attorney, Agent, or Firm*—Rader, Fishman & Grauer PLLC; Ronald P. Kananen (57) ABSTRACT

An object conveying device is provided that is capable of mounting an conveyed object such as a stamper, to a predetermined position while aligning it without deforming or damaging a conveyed object such as a stamper, a reference pin, and a molding die. This object conveying device includes a coil spring held to a case, an aligning bearing of which the outer ring is held to the coil, and a tray and a conveyed body adsorbing block that are held to the inner ring of the aligning bearing and that hold the stamper. The coil spring and the aligning bearing provide the tray and conveyed body adsorbing block with flexibility to positional variations.

6 Claims, 6 Drawing Sheets

OBJECT CONVEYING DEVICE

BACKGROUND OF THE INVENTION

1. Field of the Invention

The present invention relates to an object conveying device that mounts a conveyed object to a predetermined position while aligning it and, particularly, to an object conveying device that mounts a light-weight conveyed object to a predetermined position.

2. Description of the Related Art

An optical disk is generally manufactured by producing a master disk where recording information, a file structure, and disk specifications, such as format specifications, are recorded on a glass substrate and duplicating the master disk into a plastic substrate.

In general, duplication of the master disk into a plastic substrate is performed by an injection molding method where a definite amount of a plastic material is injected into a molding die having a plastic substrate shape, and cooled and solidified as it is. For the duplication of pit shapes on an information recording surface, a stamper is used that has replicated the pit shapes on the information recording surface of a master disk by electroplating the information recording surface. When the above-described injection molding is to be performed, the stamper is mounted inside the molding die with the surface on which the pit-shapes have been replicated faced toward the inside of the molding die. By performing injection molding in this state, an optical disk having desired pit shapes is produced.

The stamper used in this duplication process of the optical disk is stored for each kind of produced optical disk, and when the plastic substrate is to be duplicated, the stamper is replaced every time the kind of optical disk to be duplicated changes. Generally, the mounting of the stamper at a stamper replacement is performed by using a stamper mounting device, and the mounting of the stamper by the stamper mounting device is performed while aligning the stamper with a predetermined position of the molding die.

The mounting of the stamper is performed by pressing the head portion of the stamper mounting device holding the stamper against the inside of the molding die. In this case, the alignment of the stamper is performed by a reference pin for alignment provided at the head portion of the stamper mounting device being guidedly inserted into a recess of the molding die, which is a reference pin receiving hole provided inside the molding die.

However, conventional stamper mounting devices are insufficient in the flexibility of the head portion to position variations. As a result, when the reference pin provided at the head portion is guided into the recess provided inside the molding die, an excessively large force is applied to the contact portion between the reference pin and the molding die recess. This raises a problem that the reference pin and/or the molding die recess may be deformed and/or damaged.

Also, at an alignment of the stamper, when the stamper holding surface of the head portion tilts with respect to the stamper mounting surface of the molding die, the stamper held to the head portion is pressed against this stamper mounting surface in a state tilting with respect to the stamper mounting surface of the molding die. This creates a problem that the stamper may be deformed and/or damaged.

SUMMARY OF THE INVENTION

Accordingly, it is an object of the present invention to provide an object conveying device capable of mounting a conveyed object, such as a stamper, to a predetermined position while aligning it without deforming or damaging a reference pin and/or a molding die.

It is another object of the present invention to provide an object conveying device capable of mounting a conveyed object, such as a stamper, to a predetermined position while aligning it and without deforming or damaging it.

In order to achieve the above-described object, the present invention, in a first aspect, provides an object conveying device that mounts a conveyed object to a predetermined position while aligning it. This object conveying device comprises a support portion that is provided with power to move the conveyed object; a first elastic member held to the support portion; an aligning bearing wherein one of an inner ring and an outer ring is held to the first elastic member; and a conveyed object holding mechanism that holds the conveyed object, the conveyed object holding mechanism being held to one end of the ring that is not held to the first elastic member out of the inner and outer rings of the aligning bearing.

Herein, the first elastic member and the aligning bearing provide the conveyed object holding mechanism with flexibility to position variations and angle variations and, thereby, corrects positional deviations and tilting of the conveyed object when aligned.

Also, the present invention, in a second aspect, provides an object conveying device that mounts a conveyed object to a predetermined position while aligning it. This object conveying device comprises a support portion that is provided with power to convey the conveyed object; a first elastic member held to the support portion; an aligning bearing wherein one of an inner ring and an outer ring is held to the first elastic member; a common plate held to one end of the ring that is not held to the first elastic member out of the inner and outer rings of the aligning bearing; a second elastic member held by the common plate; a third elastic member held by the common plate; a tray held by the third elastic member, the tray holding the outer peripheral portion of the conveyed object; a conveyed object adsorbed block held by the second elastic member, the conveyed object adsorbing block holding the inner peripheral portion of the conveyed object at a position projecting in the direction of the conveyed object over the conveyed object holding surface of the tray; a fourth elastic member held by the conveyed object adsorbing block; a center guide held by the fourth elastic member, the center guide positioning the conveyed object with respect to the conveyed object absorbing block; and a reference pin held by the center guide.

Herein, by holding the outer periphery portion of the conveyed object by the tray and holding the inner peripheral portion thereof at a position projecting in the direction of the conveyed object over the conveyed object holding surface of the tray, the conveyed object is held with the inner peripheral portion thereof projected further outward than the outer peripheral portion thereof, and the first elastic member and the aligning bearing provide the conveyed object holding mechanism and the tray with flexibility to position variations and angle variations, thereby correcting positional deviations and tilting of the conveyed object when aligned.

In the object conveying device according to the present invention, it is preferable that the elastic force of the first elastic member be lower than that of the fourth elastic member, and that the elastic force of the fourth elastic member be lower than that of the second elastic member.

Also, in the object conveying device according to the present invention, preferably, the conveyed object adsorbing block holds the inner peripheral portion of the conveyed object at a position projecting in the direction of the conveyed object over the conveyed object holding surface of the tray in the range of 0.8 mm to 1.3 mm.

Furthermore, in the object conveying device according to the present invention, preferably, the conveyed object adsorbing block holds the inner peripheral portion of the conveyed object at a position projecting in the direction of the conveyed object over the conveyed object holding surface of the tray in the range of 1.0 mm to 1.1 mm.

Moreover, the object conveying device according to the present invention preferably has a fifth elastic member that inhibits the common plate from hanging down. Also, in the object conveying device according to the present invention, the fifth elastic member is preferably supported by the support portion, and the fifth elastic member holds the lower portion of the common plate.

Furthermore, in the object conveying device according to the present invention, preferably, the conveyed object is a stamper used for forming pits on an optical disk substrate.

The above and other objects, features, and advantages of the present invention will be clear from the following detailed description of the preferred embodiments of the invention in conjunction with the accompanying drawings.

DESCRIPTION OF THE PREFERRED EMBODIMENTS

Firstly, a first embodiment of the present invention will be described.

Figure 1:
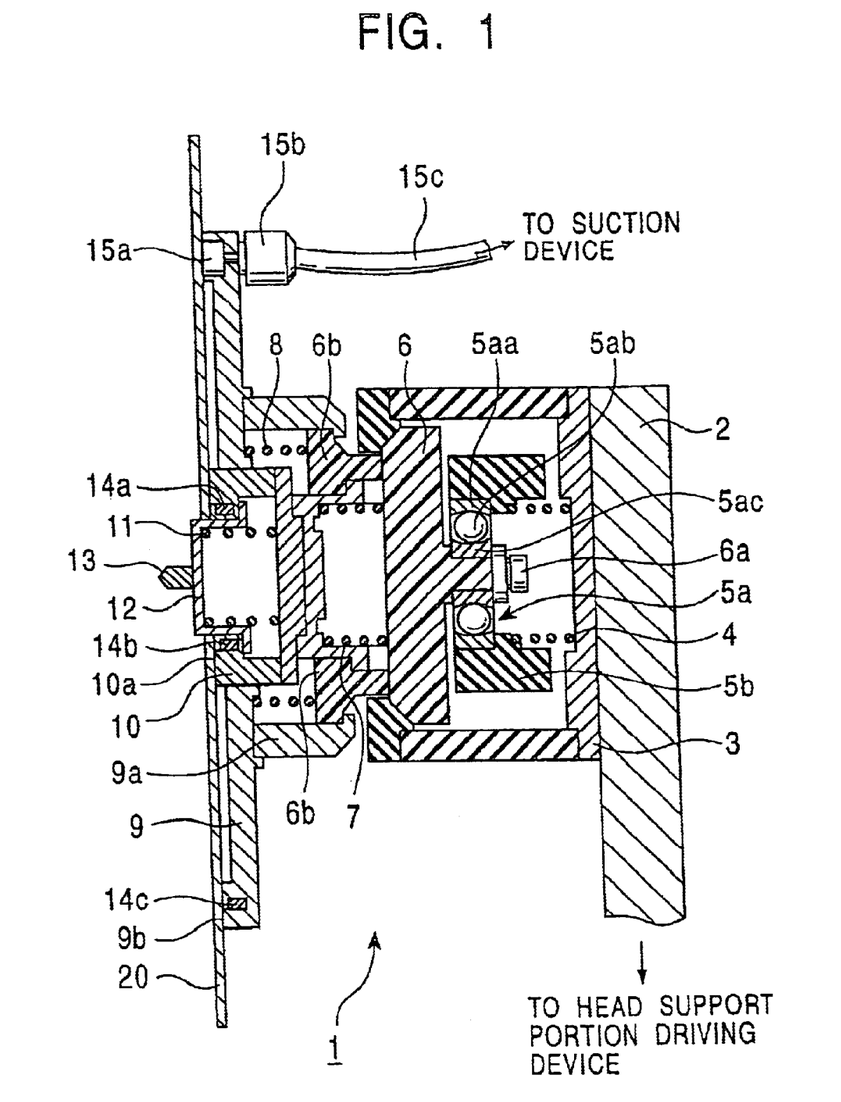
FIG. 1 is a sectional view showing the configuration of an object conveying device according to a first embodiment of the present invention.

FIG. 1 is a sectional view showing the configuration of an object conveying device 1 according to the first embodiment of the present invention. In this embodiment, a stamper 20 used for forming an optical disk is taken as an example of a conveyed object, and the object conveying device 1 is used as a device for mounting the stamper 20 to a molding die.

Referring to FIG. 1, the object conveying device 1 comprises a support portion 2 that is provided with power to convey the conveyed object and a case 3; a coil spring 4 as a first elastic member held to the support portion; an aligning bearing 5a wherein one of an inner ring or an outer ring is held to the first elastic member, a bearing receiver 5b holding the aligning bearing 5a; a common plate 6 held to one end of the ring that is not held to the first elastic member out of the inner and outer rings of the aligning bearing 5a; a coil spring 7 as a second elastic member held by the common plate 6; a coil spring 8 as a third elastic member held by the common plate 6; a tray 9 held by a third elastic member, the tray 9 being a conveyed object holding mechanism that holds the outer peripheral portion of the conveyed object, a conveyed object adsorbing block 10 held by the second elastic member, the conveyed object adsorbing block holding 10 being a conveyed object holding mechanism that holds the inner peripheral portion of the conveyed object at a position projecting in the direction of the conveyed object over the conveyed object holding surface of the tray 9; a coil spring 11 as a fourth elastic member held by the conveyed object adsorbing block 10; a center guide 12 held by the fourth elastic member, the center guide 12 positioning the conveyed object with respect to the conveyed object adsorbing block 10; a reference pin 13 held by the center guide 12; magnets 14a to 14c holding the conveyed object by elastic forces; a adsorption pad 15a holding the conveyed object by the adsorbing force thereof; a adsorption tube mounting mechanism 15b; and an adsorption tube 15c.

As shown in FIG. 1, the head support portion 2 has, for example, a columnar structure, such as a cylinder or a prism, and is provided with power to move a stamper as a conveyed object by a power of a motor (not shown) or the like. The material constituting the head support portion 2 is not particularly limited. Any material that has a sufficient mechanical strength, including stainless steel, may be used.

As illustrated in FIG. 1, the case 3 has a shape such that one open surface in, e.g., a substantially cylindrical structure is closed and the side surface edge portion on the open surface side thereof is folded back inward. The material constituting the case 3 is not particularly limited. Any material that has a sufficient mechanical strength, including stainless steel, may be used.

As shown in FIG. 1, the coil springs 4, 7, 8, and 11 are, for example, helical springs. Herein, for example, the elastic force of the coil spring 4 is lower than that of the coil spring 11, and the elastic force of the coil spring 11 is lower than that of the coil spring 7. The coil spring 8 expands and contracts without interlocking with the other coil springs 4, 7, and 11, and, therefore, the elastic force of the coil spring 8 is not particularly limited. Specifically, it is desirable that the elastic forces of these coils have, for example, the following approximate values: the coil spring 4: 0.7 kgf, the coil spring 7: 3.0 kgf, the coil spring 8: 1.3 kgf, and the coil spring 11: 0.8 kgf. Setting the elastic forces of the coil springs 4, 7, and 11 in this manner allows the stamper 20 to be mounted to the molding die while being appropriately aligned. More details in this respect will be provided later. Meanwhile, in this embodiment, although coil springs are used as elastic members, other springs, such as plate springs or the like, may be employed as elastic members.

As shown in FIG. 1, the aligning bearing 5a comprises an outer ring 5aa, which has a substantially cylindrical structure of which the inner wall is formed into a concave surface; an inner ring 5ac, which has a diameter smaller than that of the outer ring 5aa, and which has a substantially cylindrical structure of which the inner wall is formed into a concave surface; and a plurality of bearing balls 5ab disposed between the inner wall of the outer ring 5aa and the outer wall of the inner ring 5ac. Here, the inner ring 5ac and the outer ring 5aa are arranged so as to be capable of a relative rotating motion (a substantially relative three-dimensional rotating motion) in a manner such that the angle formed by the central axes thereof can be displaced. In this substantially relative three-dimensional rotating motion, it is desirable that the aligning bearing 5a is arranged so that the solid angle rotates by approximately 5 degrees.

As illustrated in FIG. 1, the bearing receiver 5b has a substantially cylindrical structure that has a level difference portion on the inner wall thereof, and holds the coil spring 4 and the aligning bearing 5a by this level difference portion. The material constituting the bearing receiver 5b is not particularly limited. Any material that has a sufficient mechanical strength, including stainless steel, may be used.

As shown in FIG. 1, the common plate 6 has a structure wherein, for example, a substantially columnar mounting shaft 6a is provided in the vicinity of the center of one surface side of a disk-like structure, and wherein a common plate cylinder portion 6b having a substantially cylindrical shape is provided on the other surface side thereof. Also, each of the inner wall and outer wall of the common plate cylinder portion 6b is formed into a level difference shape. The material constituting the common plate 6 is not particularly limited. Any material that has a sufficient mechanical strength, including stainless steel, may be used.

As illustrated in FIG. 1, the tray 9 has, for example, a structure that is formed into a substantially annular shape and has a shape such that one portion of the outer periphery thereof is folded back in one direction. Also, a tray cylinder portion 9a having, e.g., a substantially cylindrical structure, of which one end is folded back inward, is adhered to one side of the tray 9. The material constituting the tray 9 is not particularly limited. Any material that has a sufficient mechanical strength, including stainless steel, may be used.

As illustrated in FIG. 1, the conveyed object adsorbing block 10 has a shape such that a structure wherein one open surface in a substantially cylindrical structure is closed, and wherein the side surface edge portion on the open surface side thereof is folded back inward, and a structure wherein one open surface in the substantially cylindrical structure is closed, and wherein the side surface edge portion on the open surface side thereof is folded back outward, are held together so that the open surfaces thereof face away from each other. The material constituting the conveyed object adsorbing block 10 is not particularly limited. Any material that has a sufficient mechanical strength, including stainless steel, may be used.

As illustrated in FIG. 1, the center guide 12 has a shape, for example, such that one open surface in a substantially cylindrical structure is closed and the side surface edge portion on the open surface side thereof is folded back outward. The material constituting the center guide 12 is not particularly limited. Any material that has a sufficient mechanical strength, including stainless steel, may be used.

As shown in FIG. 1, the reference pin 13 has, e.g., a substantially columnar structure of which the front end is rounded off. The material constituting the reference pin 13 is not particularly limited. Any material that has a sufficient mechanical strength, including stainless steel, may be used.

The magnets 14a to 14c are preferably permanent magnets and hold the stamper 20 by the magnetic force thereof. At least one portion of the magnets 14a to 14c may be an electromagnet, which generates a magnetic force with a current supplied.

The adsorption pad 15a has, for example, a cylindrical structure that is provided with a hermeticity enhancing mechanism formed at the front end thereof and has vacuum sensor formed therein for detecting an adsorbed state of the conveyed object, such as stamper 20.

One end of the head support portion 2 is mounted to a head support portion driving device (not shown) having a driving source, such as a motor, so that the power thereof is transmitted thereto. Also, as shown in FIG. 1, the outside of one surface closed in the case 3 is adhered to the side surface of the other end side of the head support portion 2, and one end of the coil spring 4 is held to the inner surface side of the case 3. The other end side of the coil spring 4 is held to the level difference portion on the inner wall of the bearing receiver 5b, which holds the outer ring 5aa of the aligning bearing 5a by another portion of the level difference portion on the inner wall thereof. As a consequence, the outer ring 5aa of the aligning bearing 5a is held to the coil spring 4 via the bearing receiver 5b.

As illustrated in FIG. 1, the inner ring 5ac of the aligning bearing 5a holds the mounting shaft 6a of the common plate 6. The common plate 6 is disposed so that the disk-like structure portion thereof is accommodated within the case 3. At this time, the common plate 6 is arranged so that it is pressurized by the coil spring 4 and the inward folded-back portion on the open surface side of the case 3 constitutes a stopper against this pressurization. Also, the common plate 6 holds one end of the coil spring 7 at the inside portion of the common plate cylinder portion 6b, while it holds one end of the coil spring 8 at the front end portion of the common plate cylinder portion 6b.

As shown in FIG. 1, the coil spring 8 pressurizes the tray 9 by the elastic force thereof. The tray 9 is arranged so that the inward folded-back portion in the tray cylinder portion 9a is inserted into the level difference portion on the outer wall of the common plate cylinder portion 6b, whereby the inserted portion performs the function of a stopper against the pressurization by the coil spring 8. As a consequence, the tray 9 is held to the inner ring 5ac of the aligning bearing 5a via the common plate 6 and the coil spring 8.

As illustrated in FIG. 1, the magnet 14c and the adsorption pad 15a are mounted to the outer peripheral portion of the tray 9, and an adsorption tube 15c connected to a suction device for sucking is connected to the adsorption pad 15a via an adsorption tube mounting mechanism 15b.

As shown in FIG. 1, the other end of the coil spring 7 holds the conveyed object adsorbing block 10, while the other end of the coil spring 8 holds the tray 9. At this time, the coil spring 7 pressurizes the conveyed object absorbing block 10 by the elastic force thereof. The conveyed object adsorbing block 10 is arranged so that the outward folded-back portion on the open surface side thereof is inserted into the level difference portion on the inner wall of the common plate cylinder portion 6b, whereby the inserted portion performs the function of a stopper against the pressurization by the coil spring 7. As a consequence, the conveyed object adsorbing block 10 is held to the inner ring 5ac of the aligning bearing 5a via the common plate 6 and the coil spring 7.

As illustrated in FIG. 1, the magnets 14a and 14b are mounted to the inward folded-back portion on the open surface side of the conveyed object adsorbing block 10, and the inside portion of the closed surface of the conveyed object adsorbing block 10 holds one end of the coil spring 11. The other end of the coil spring 11 holds center guide 12, and the coil spring 11 pressurizes the center guide 12 by the elastic force thereof. The center guide 12 is arranged so that the outward folded-back portion on the open surface side thereof is inserted into the inward folded-back portion on the open surface side of the conveyed object adsorbing block 10, whereby the inserted portion performs the function of a stopper against the pressurization by the coil spring 11. The reference pin 13 is adhered to the central portion outside the closed surface of the center guide 12.

The holding surface 10a, which is an annular front end portion in the conveyed object absorbing block 1, is disposed at a position projecting over the holding surface 9b, which is the annular held portion of the stamper 20 in the tray 9. The width of this projection is preferably in the range of 0.8 mm to 1.3 mm, and it is more preferably in the range of 1.0 mm to 1.1 mm.

The stamper 20 as a conveyed object is held to the tray 9 and the conveyed object absorbing block 10 by the magnetic forces of the magnets 14a to 14c and the adsorbing force of the adsorption pad 15a. Here, the stamper 20 is a substantially annular disk having a central hole, and the stamper 20 held in this manner is positioned with respect to the tray 9 and the conveyed object absorbing block 10 by inserting the center guide 12 into the central hole of the stamper 20. Here, the outer diameter of the center guide 12 and the inner diameter of the central hole of the stamper 20 are preferably arranged to have sizes such that, when the center guide 12 is inserted into the central hole of the stamper 20, a gap of approximately 1 to 2 $\mu$m is created therebetween. Also, as described above, by disposing the holding surface 10a of the conveyed object adsorbing block 10 at a position projecting over the holding surface 9b of the tray 9, the tray 9 holds the outer peripheral portion of the stamper 20, while the conveyed object absorbing block 10 holds the inner portion of the stamper 20 at a position projecting in the direction of the stamper 20 over the stamper holding surface of the tray 9, preferably in the range of 0.8 mm to 1.3 mm, and more preferably in the range of 1.0 mm to 1.1 mm. The stamper 20 held in this manner is arranged so that the inner peripheral portion thereof held by the conveyed object adsorbing block 10 becomes convex in the outward direction (i.e., in the direction from the conveyed object adsorbing block 10 toward the common plate 6), and the outer peripheral portion thereof held by the tray 9 warps in the inward direction (i.e., in the direction from the conveyed object adsorbing block 10 toward the common plate 6), as compared with the inner peripheral portion thereof.

Next, a description will be given of the mounting operation of the stamper 20 to the mounting die by the object conveying device 1 according to the present embodiment.

Figure 2:
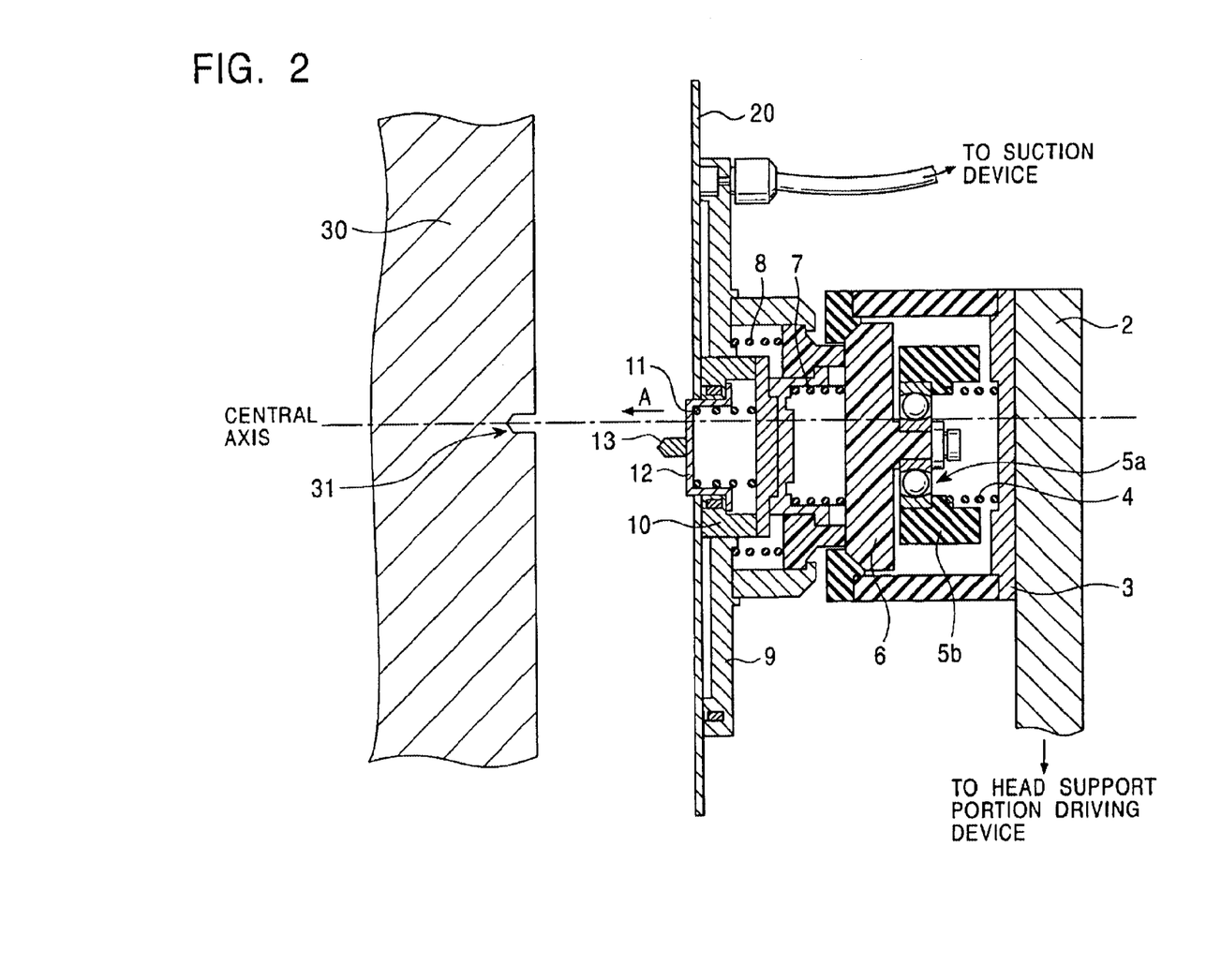
FIG. 2 is a sectional view of the object conveying device according to the first embodiment of the present invention, in which the mounting operation of a stamper to a molding die by this object conveying device is shown.
Figure 3:
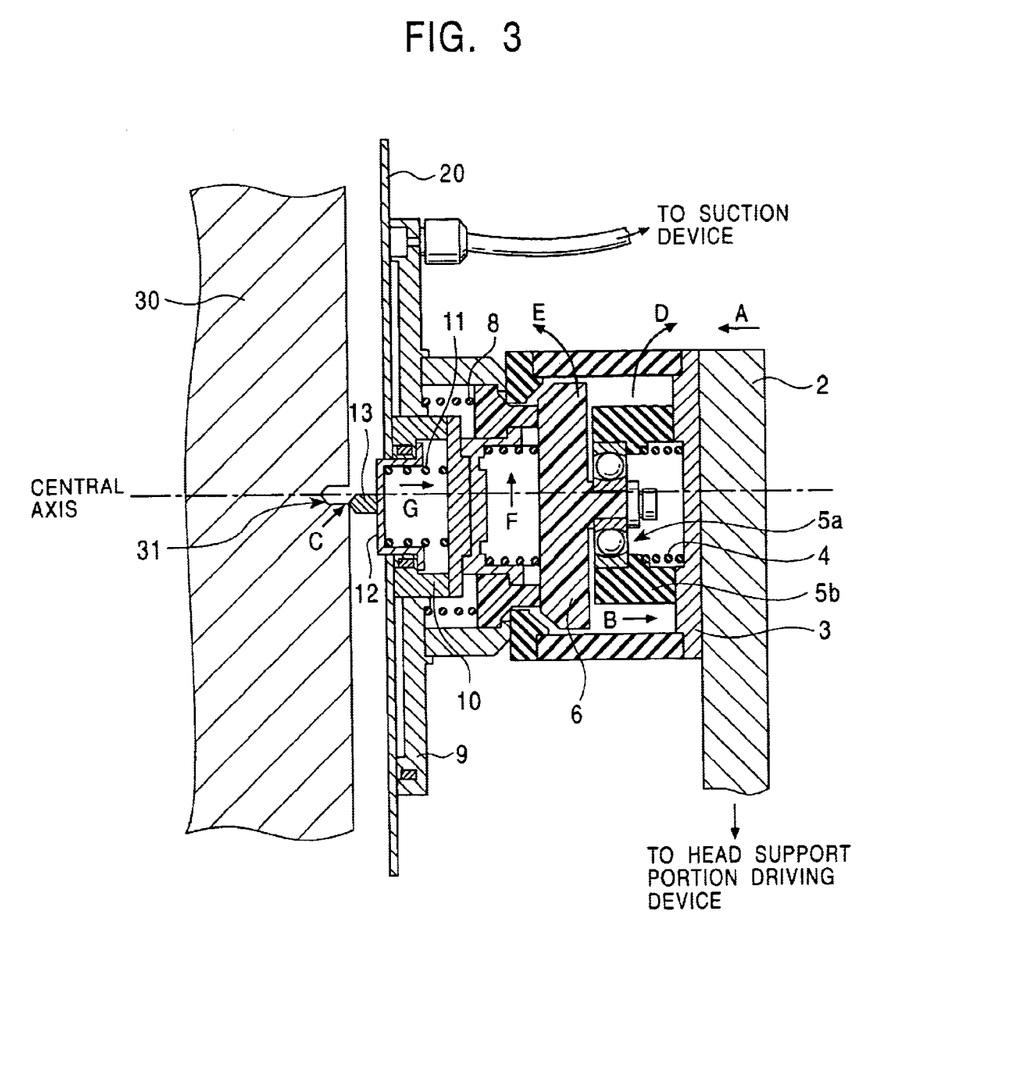
FIG. 3 is a sectional view of the object conveying device according to the first embodiment of the present invention, in which the mounting operation of the stamper to the molding die by this object conveying device is shown.
Figure 4:
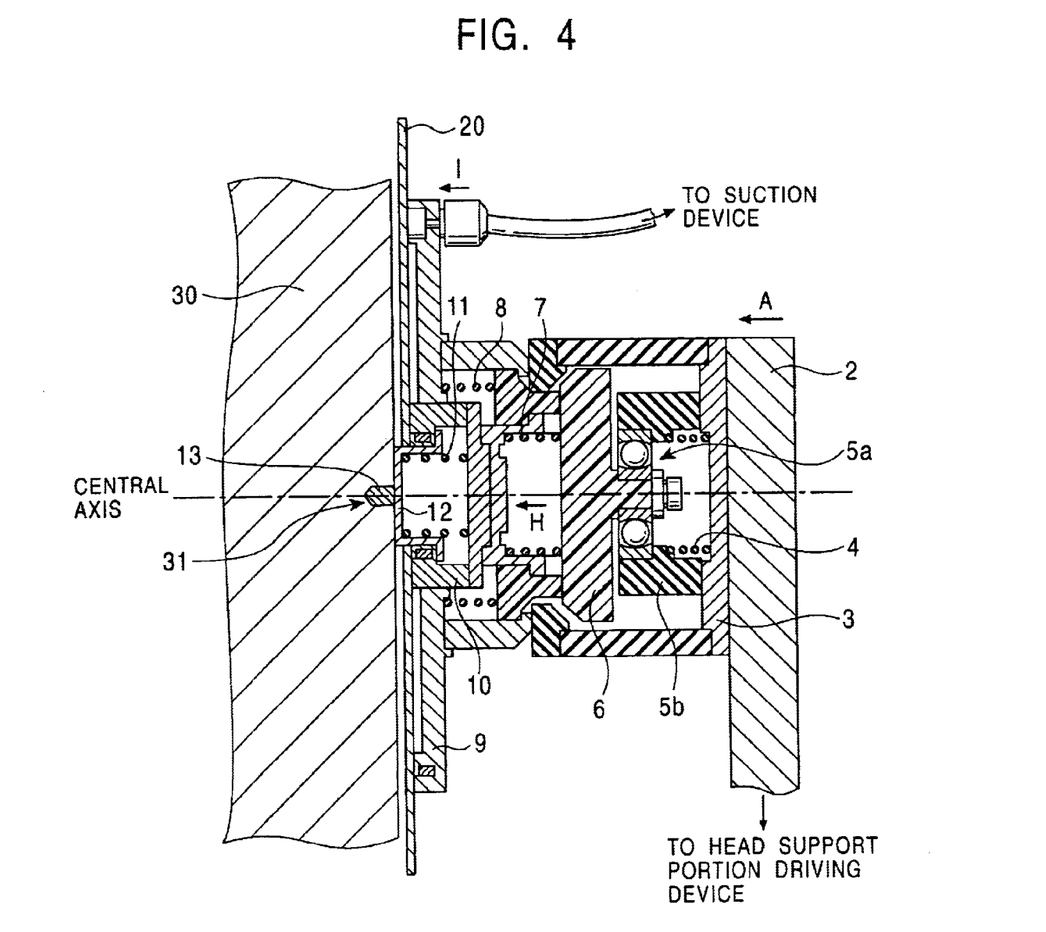
FIG. 4 is a sectional view of the object conveying device according to the first embodiment of the present invention, in which the mounting operation of the stamper to the molding die by this object conveying device is shown.

FIGS. 2 to 4 are sectional views of the object conveying device 1 according to the present embodiment wherein the mounting operation of the stamper 20 to a molding die 30 by this object conveying device 1 is shown.

As shown in FIG. 2, when mounting the stamper 20 to the molding die 30, first, the stamper 20 to be mounted is caused to be held to the object conveying device 1, as described above. Next, by driving the head support portion 2 by a head support portion driving device (not shown), the stamper 20 is conveyed up to the mounting position of the molding die 30 (see FIG. 2).

As illustrated in FIG. 2, the molding die 30 to which the stamper 20 is to be mounted, has a molding die recess 31, which is a hole into which the reference pin 13 of the object conveying device 1 is to be inserted for positioning. When the stamper 20 has been conveyed up to the mounting position of the molding die 30, as described above, the object conveying device 1 is generally disposed at a position such that the position of the reference pin 13 thereof deviates from the central axis, which is coaxial with the molding die recess 31, due to a driving control error of the head support portion driving device or the like (see FIG. 2). The object conveying device 1 in this embodiment mounts the stamper 20 held by this device to the molding die 30 while performing an alignment to eliminate the positional deviation from the central axis.

When the stamper 20 has been conveyed up to the mounting position of the molding die 30, the head support portion 2 is now moved in the A direction shown in FIG. 2 by the head support portion driving device (not shown). As the head support portion 2 is moved in the A direction, as shown in FIG. 3, first, the front-end portion of the reference pin 13 makes contact with the edge portion of the molding die recess 31. When the head support portion 2 is further continued to be moved, the coil spring 4, which has the lowest elastic force of the coil springs 4, 7 and 11, contracts under pressure from the edge portion of the molding die recess 31 in contact with the front end of the reference pin 13. As a result, the bearing receiver 5b, the aligning bearing 5a, the common plate 6, and the like, which have been held by the coil spring 4, move in the B direction shown in FIG. 3, and the common plate 6, which has been in contact with the inward folded-back portion on the open surface side of the case 3, leaves the case 3, thereby allowing an aligning movement (a movement in the case 3) of the common plate 6.

When continuing to move the head support portion 2 in the A direction in this state, the reference pin 13 in contact with the edge portion of the molding die recess 31 is applied with a force in the C direction shown in FIG. 3. This is because the front-end portion of the reference pin 13 is formed so as to be rounded off. When the reference pin 13 is thus applied with the force in the C direction, this force is transmitted to the common plate 6 via the center guide 12, the coil springs 7 and 11, and the conveyed object adsorbing block 10. The common plate 6 to which such a force has been transmitted moves to the F direction shown in FIG. 3, that is, in the direction substantially parallel to the surface of the molding die 30, by the combination of a substantially rotating movement of the bearing receiver 5b in the D direction shown in FIG. 3 due to a deflection of the coil spring 4 and a substantially rotating movement (a substantially three-dimensional rotating movement) in the E direction shown in FIG. 3, such that the angle formed by the central axes of the inner ring 5ac and the outer ring 5aa of the aligning bearing 5a is displaced. When the common plate 6 thus moves to the F direction, that is, in the direction substantially parallel to the surface of the molding die 30, the coil springs 7, 8, and 11, the tray 9, the conveyed object adsorbing block 10, the center guide 12, and the reference pin 13, which are held by the common plate 6, also move to the F direction, that is, in the direction substantially parallel to the surface of the molding die 30. As a consequence, the reference pin 13 is inserted into the molding die recess 31 while being guided in the central axis direction, and the stamper 20 is guided to an appropriate position of the molding die 30 in parallel with the surface of the molding die 30. Guiding the stamper 20 to the appropriate position of the molding die 30 substantially in parallel with the surface of the molding die 30 in this way, inhibits the stamper 20 from making contact with the surface of the molding die 30 in a tilting state and becoming deformed under the pressure from the surface.

When the reference pin 13 is inserted into the molding die recess 31, the center guide 12 makes contact with the surface of the molding die 30, the head support portion 2 is moved in the A direction, and the coil spring 11, which has an elastic force one rank higher than that of the coil spring 4, now contracts. Consequently, the center guide 12 held by this coil spring 11 moves in the G direction shown in FIG. 3. This movement of the center guide 12 is performed until the surface of the center guide 12 becomes identical with that of the stamper 20, as shown in FIG. 4.

When the head support portion 2 is further continuously moved in the A direction after the surface of the center guide 12 has become identical with that of the stamper 20, the coil spring 7, which has an elastic force one rank higher than that of the coil spring 11, now contracts. When the coil spring 7 contracts, the conveyed object adsorbing block 10 held to the coil spring 7 pressurizes the inner peripheral portion of the stamper 20 in the H direction shown in FIG. 4 by the elastic force thereof and presses the inner peripheral portion of the stamper 20 against the molding die 30. Here, the reason why the inner peripheral portion of the stamper 20 is first pressed against the molding die 30 is because, as described above, the stamper 20 is arranged so that the inner peripheral portion thereof held by the conveyed object adsorbing block 10 becomes convex in the outward direction, and that the outer peripheral portion thereof held by the tray 9 warps in the inward direction, as compared with the inner peripheral portion.

When the head support portion 2 is further continuously moved in the A direction, the coil spring 8 now contracts. When the coil spring 8 contracts, the tray 9 held to the coil spring 8 pressurizes the outer peripheral portion of the stamper 20 in the I direction shown in FIG. 4 by the elastic force thereof and presses the outer peripheral portion of the stamper 20 against the molding die 30.

In this manner, first by pressing the inner peripheral portion of the stamper 20 that has become convex in the outward against the molding die 30, and then by pressing the outer peripheral portion of the stamper 20 against the molding die 30, it is possible to dispose the stamper 20 on the molding die 30 while centering the stamper 20 with respect to the central axis positioned by inserting the reference pin 13 into the molding die recess 31.

Even when the stamper 20 has caused deflection because the inner peripheral portion of the stamper 20 is pressed against the molding die 30 by the elastic force of the coil spring 7, and then the outer peripheral portion of the stamper 20 is pressed against the molding die 30 by the elastic force of the coil spring 8, it is possible to mount the stamper 20 to the molding die 30 by correcting the deflection while relieving the deflection outside the stamper 20.

By pressing the inner and outer peripheral portions of the stamper 20 against the molding die 30 in this manner, the stamper 20 is applied with a force that makes the stamper 20 parallel to the surface of the molding die 30. The force thus applied is accommodated by the deflection of the coil spring 4 and the three-dimensional rotation of the aligning bearing 5a, thereby allowing the stamper to be made parallel to the surface of the molding die 30 without deforming the stamper 20 by the applied force.

With the stamper 20 thus pressed against the molding die 30, the holding of the stamper 20 by the adsorption pad 15a and the magnets 14a to 14c is now released. This releases the stamper 20 from the object conveying device 1, thereby completing the mounting of the stamper 20 to the molding die 30. Here, by strengthening the adsorbing force of the adsorption pad 15a when holding the stamper 20 to an extent such as to hold the stamper 20 only by this adsorbing force, and by maintaining the strength of the magnetic forces of the magnets 14a to 14c to an extent such as to assist the holding of the stamper 20 by the adsorption pad 15a, it is possible to detach the stamper 20 only by switching on/off the suction device.

In this way, in the present embodiment, since the object conveying device 1 is equipped with the coil spring 4 held to the case 3, the aligning bearing 5a, of which the outer ring 5aa is held to the coil spring 4, the tray 9 and the conveyed object adsorbing block 10, which are held to the inner ring 5ac of the aligning bearing 5a and which hold the stamper 20, the flexibilities of the tray 9 and the conveyed object adsorbing block 10 can be enhanced, and when the reference pin 13 is guided into the molding die recess 31 at the mounting of the stamper 20 to the molding die 30, the contact portion between the reference pin 13 and the molding die recess 31 can be inhibited from being subjected to a larger force than is necessary. This allows the stamper 20 to be mounted to the predetermined position while aligning it, without deforming or damaging the reference pin 13 and/or the molding die recess 31.

Also, since the object conveying device 1 is equipped with the coil spring 4 held to the case 3, the aligning bearing 5a, of which the outer ring 5aa is held to the coil spring 4, the tray 9 and the conveyed object adsorbing block 10, which are held to the inner ring 5ac of the aligning bearing 5a and which hold the stamper 20, the tilting of the stamper 20 with respect to the surface of the molding die 30 can be accommodated by the coil spring 4 and the aligning bearing 5a at the mounting of the stamper 20 to the molding die 30. This allows the stamper 20 to be inhibited from deformation and/or damage caused by its being pressed against the molding die 30 in a tilting state.

Furthermore, in this embodiment, since the conveyed object adsorbing block 10 is held by the coil spring 7 and the tray 9 is held by the coil spring 8, it is possible to absorb the shock by the coil springs 7 and 8 when the stamper 20 abuts against the surface of the molding die 30 in a tilting state at the mounting of the stamper 20 to the molding die 30, thereby allowing the stamper 20 to be inhibited from deformation and/or damage caused by its abutting against the molding die 30 in a tilting state.

Moreover, in this embodiment, since the elastic force of the coil spring 4 is set to be lower than that of the coil spring 11, when the reference pin 13 is pressed against the edge portion of the molding die recess 31 of the molding die 30, the coil spring 4 contracts before the coil spring coil 11 contracts under the pressure. As a result, before the center guide 12 is depressed by the contraction of the coil spring 11, the contraction of the coil spring 4 depresses the common plate 6, thereby releasing the common plate 6 from the case 3. Consequently, before the stamper 20 goes out of alignment with the tray 9 and the conveyed object adsorbing block 10 due to the depression of the center guide 12, it is possible to align the reference pin 13 and mount the stamper 20 to an appropriate position of the molding die 30.

Furthermore, in this embodiment, since the holding surface 10a of the conveyed object adsorbing block 10 is disposed at a position projecting over the holding surface 9b of the tray 9, the inner peripheral portion of the stamper 20 can be made convex in the outward direction, and the outer peripheral portion thereof can be disposed so as to warp in the inward direction as compared with the inner peripheral portion thereof. Thereby, the outer peripheral portion of the stamper 20 can be pressed against the molding die 30 after the inner peripheral portion thereof has first been pressed against the molding die 30, which has become convex. As a consequence, the stamper 20 can be disposed on the molding die 30 while centering the stamper 20 with respect to the central axis positioned by inserting the reference pin 13 into the molding die recess 31.

Also, in this embodiment, since the holding surface 10a of the conveyed object adsorbing block 10 is disposed at a position projecting over the holding surface 9b of the tray 9, the inner peripheral portion of the stamper 20 can be made convex in the outward direction, and the outer peripheral portion thereof can be disposed so as to warp in the inward direction as compared with the inner peripheral portion thereof. Thereby, it is possible to press the outer peripheral portion of the stamper 20 against the molding die 30 after the inner peripheral portion thereof has first been pressed against the molding die 30, which has become convex. As a result, even when the stamper 20 generates deflection, the stamper 20 can be mounted on the molding die 30 by correcting the deflection while relieving the deflection outside the stamper 20.

The present invention is not limited to the above-described embodiment. For example, in this embodiment, the arrangement is such that the outer ring 5aa of the aligning bearing 5a is held by the coil spring 4 via the bearing receiver 5b, and that the common plate 6 is held by the inner ring 5ac of the aligning bearing 5a. Alternatively, however, the arrangement may be such that the inner ring 5ac of the aligning bearing 5a is held by the coil spring 4, and the common plate 6 is held by the outer ring 5aa of the aligning bearing 5a. In this case, the tray 9 and the conveyed object adsorbing block 10 are held by the outer ring 5aa of the aligning bearing 5a via the common plate 6 and the coil springs 7 and 8.

In this embodiment, the stamper 20 has been taken as an example of the conveyed object. However, the preset invention may be applied to the conveyance of other objects such as optical disks.

Next, a second embodiment according to the present invention will be described.

The second embodiment is a modification of the first embodiment. The second embodiment is different from the first embodiment in that there is provided a coil spring for inhibiting the common plate 6 from hanging down. Hereinafter, descriptions will be mainly made of the differences of the second embodiment from the first embodiment. Here, matters of the second embodiment common with the first embodiment are omitted from the descriptions.

Figure 5:
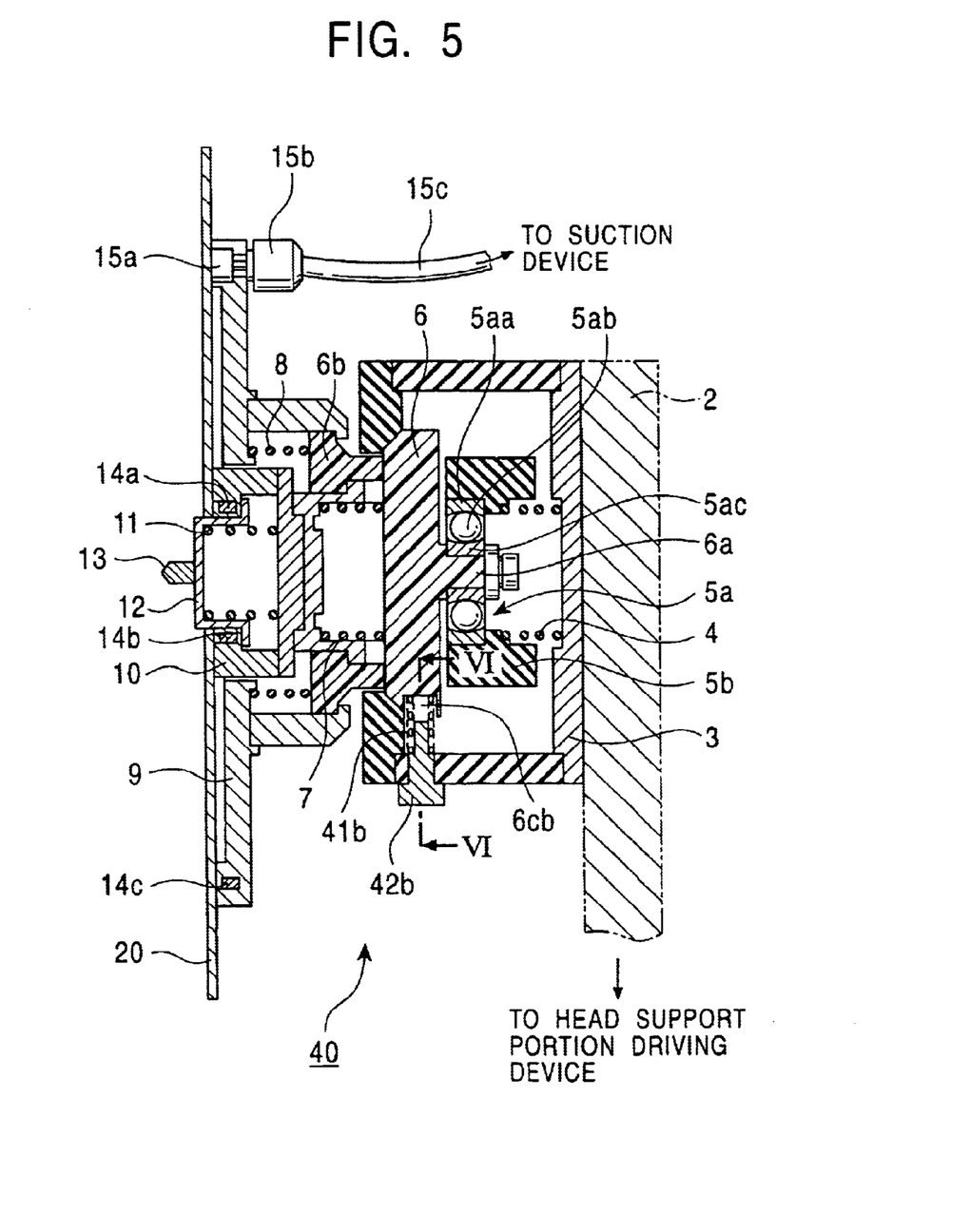
FIG. 5 is a sectional view showing the configuration of the object conveying device according to a second embodiment of the present invention.
Figure 6:
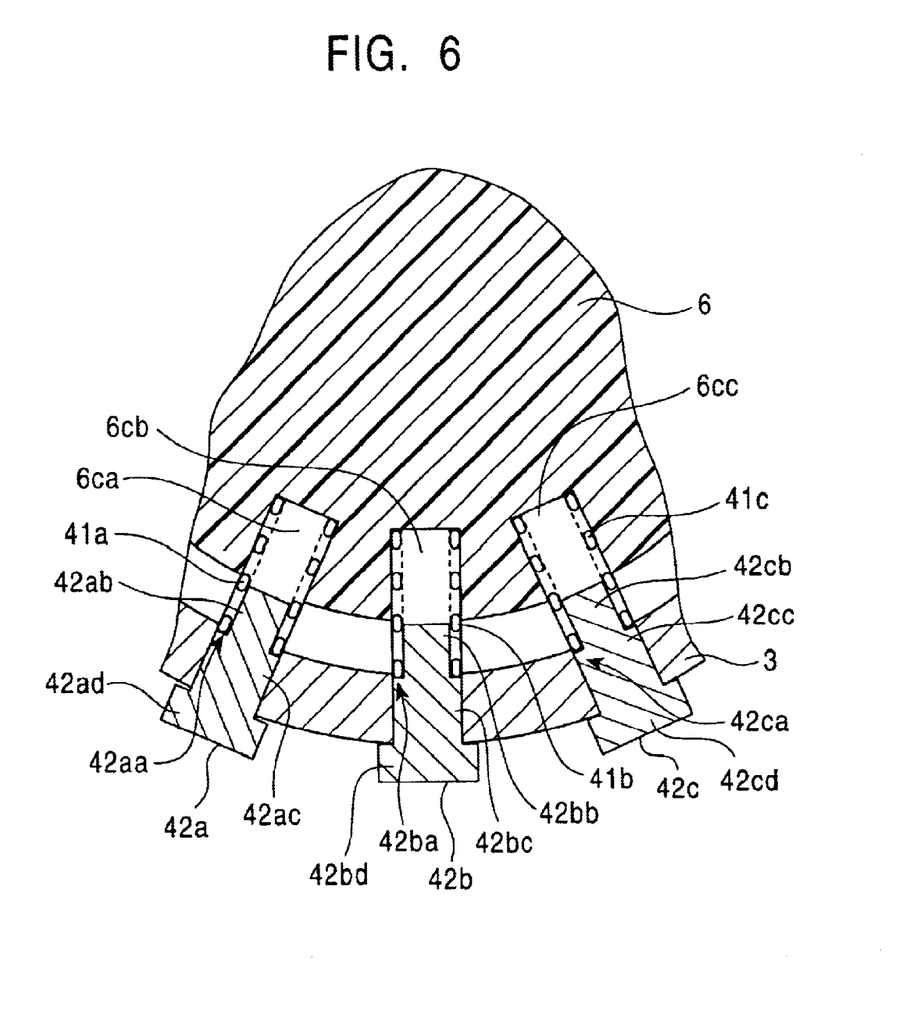
FIG. 6 is a sectional view showing the VI—VI section in FIG. 5.

FIG. 5 is a sectional view showing the configuration of an object conveying device 40 according to the present embodiment, and FIG. 6 is a sectional view showing the VI—VI section in FIG. 5. Here, portions common with the first embodiment in FIGS. 5 and 6 are designated by the same reference numerals as those in FIG. 1.

Referring to FIG. 5, the object conveying device 40 comprises the support portion 2; the case 3; the aligning bearing 5a; the bearing receiver 5b; the common plate 6; the coil springs 4, 7, 8, and 11; the conveyed object adsorbing block 10; the center guide 12; the reference pin 13; the tray 9; the magnets 14a to 14c; the adsorption pad 15a, the adsorption tube mounting mechanism 15b, the adsorption tube 15c; and in addition, coil springs 41a to 41c, which are fifth elastic members for inhibiting the common plate 6 from hanging down; and spring guide bolts 42a to 42c for holding the coil springs 41a to 41c.

The coil springs 41a to 41c are, for example, the same helical springs as those in the first embodiment. In this embodiment, although coil springs are used as elastic members, plate springs or other springs may be employed as elastic members.

As shown in FIG. 6, the spring guide bolts 42a to 42c are, for example, bolts each having a shape such that cylinders mutually different in the outer diameter are coaxially combined. Taking advantage of the differences in the outer diameter, level difference portions 42aa, 42ba, and 42ca are formed. For example, in the case of the spring guide bolt 42a, at one end of the front-end portion 42ab, which is a cylindrical portion having the smallest outer diameter, there is provided an intermediate portion 42ac, which is a cylindrical portion having the second smallest outer diameter, and a rear portion 42ad, which is a substantially hexagonal columnar portion having the largest outer diameter, is provided on the other end side of the above-mentioned intermediate portion 42ac. For example, the front end portion 42ab, the intermediate portion 42ac, and the rear portion 42ad are coaxially disposed, and the level difference portion 42aa is formed by the difference in the outer diameter between the front-end portion 42ab and the intermediate. portion 42ac. With regard to such arrangements, the same goes for spring guide bolts 42b and 42c having front-end portions 42bb and 42cb, intermediate portions 42bc and 42cc, and rear portions 42bd and 42cd, respectively. As shown in FIG. 6, the lengths of the front-end portions 42ab, 42bb and 42cb are preferably arranged so that, when the spring guide bolt 42a is mounted to the case 3, the tip of each of the front-end portions 42ab, 42bb and 42cb does not reach the bottom surface of the common plate 6. The material constituting spring guide bolts 42a to 42c is not particularly limited. Any material that has some degree of strength, including stainless steel, may be used.

As illustrated in FIG. 6, spring holding holes 6ca to 6cc into which one-side ends of the coil springs 41a to 41c are to be mounted, respectively, are formed on the bottom side of the common plate 6. The shapes of the spring holding holes 6ca to 6cc are not particularly limited. Any shapes for these spring holding holes into which the one-side ends of the coil springs 41a to 41c can be inserted, including a cylindrical shape, may be used.

As shown in FIG. 6, the spring guide bolts 42a to 42c are inserted into the bottom surface of the case 3 with a substantially uniform spacing thereamong. The front-end portions 42ab, 42bb and 42cb of the spring guide bolts 42a to 42c are inserted into the one-side ends of the coil springs 41a to 41c, respectively, and the one-end sides of the coil springs 41a to 41c into which the front-end portions 42ab, 42bb and 42cb of the spring guide bolts 42a to 42c have been inserted are held by the level difference portions 42aa, 42ba, and 42ca, respectively. The other ends of the coil springs 41a to 41c are inserted into the spring holding holes 6ca, 6cb, and 6cc and are held thereby, respectively.

Next, the operation of the object conveying device 40 according to the present embodiment will be described.

The operation of the object conveying device 40 is fundamentally the same as that of the object conveying device 1 according to the first embodiment. The present embodiment is different from the first embodiment in that, when the coil spring 4 contracts and the common plate 6 is released from the case 3, the lower portion of the common plate 6 is held by the coil springs 41a to 41c. As can be seen from FIG. 6, the holding of the lower portion of the common plate 6 in this case is performed only by the coil springs 41a to 41c and not by the spring guide bolts 42a to 42c. This prevents the common plate 6 from being fixed by the spring guide bolts 42a to 42c, thereby securing the flexibility of the common plate 6.

In this manner, by holding the lower portion of the common plate 6 by the coil springs 41a to 41c, the coil spring 4 contracts, and thereby it is possible to prevent the common plate 6 from hanging down when having become free, while securing flexibility of the common plate 6.

The present invention is not limited to the above-described embodiments. In this embodiment, the arrangement is such that the lower portion of the common plate 6 is held by the coil springs 41*a* to 41*c* to prevent the common plate 6 from hanging down. Alternatively, however, the arrangement may be, for example, such that, by adhering the one-side ends of these coil springs to the inner side surface of the case 3 (i.e., the connection portion side between the head support portion 2 and the case 3) and adhering the other ends thereof to the side surface of the common plate 6 (i.e., the surface where the mounting shaft 6*a* is provided), the common plate 6 is held from the side surface thereof, thereby suppressing the hanging down of the common plate 6.

As is evident from the foregoing, the object conveying device according to the present invention is arranged to comprise a support portion that is provided with power to move a conveyed object; a first elastic member held to the support portion; an aligning bearing wherein one of an inner ring and an outer ring thereof is held to the first elastic member; and a conveyed object holding mechanism that holds the conveyed object, the conveyed object holding mechanism being held to one end of the ring that is not held to the first elastic member out of the inner and outer rings of the aligning bearing. Therefore, the conveyed object can be mounted to the predetermined position while aligning it and without deforming or damaging the reference pin and/or the molding die.

Also, since the object conveying device according to the present invention is arranged to comprise the support portion that is provided with a power to move the conveyed object; the first elastic member held to the support portion; the aligning bearing where one of the inner ring and the outer ring thereof is held to the first elastic member; and the conveyed object holding mechanism that holds the conveyed object, the conveyed object holding mechanism being held to one end of the ring that is not held to the first elastic member out of the inner and outer rings of the aligning bearing, it is possible to mount the conveyed object to the predetermined position while aligning it and without deforming or damaging the conveyed object.

While the present invention has been described with reference to what are at present considered to be the preferred embodiments, it is to be understood that various changes and modifications may be made thereto without departing from the invention in its broader aspects and therefore, it is intended that the appended claims cover all such changes and modifications that fall within the true spirit and scope of the invention.

What is claimed is:

1. An object conveying device that mounts a conveyed object to a predetermined position while aligning the conveyed object, the device comprising:

a support portion that is provided with a power to move the conveyed object;

a first elastic member held to the support portion;

an aligning bearing wherein one of an inner ring and an outer ring is held to the first elastic member;

a common plate held to one end of the ring that is not held to the first elastic member out of the inner and outer rings of the aligning bearing;

a second elastic member held by the common plate;

a third elastic member held by the common plate;

a tray held by the third elastic member, the tray holding the outer peripheral portion of the conveyed object;

a conveyed object adsorbing block held by the second elastic member, the conveyed object adsorbing block holding an inner peripheral portion of the conveyed object at a position projecting in relation to a conveyed object holding surface of the tray in the direction of the conveyed object;

a fourth elastic member held by the conveyed object adsorbing block;

a center guide held by the fourth elastic member, the center guide positioning the conveyed object with respect to the conveyed object adsorbing block; and a reference pin held by the center guide wherein the elastic force of the first elastic member is lower than that of the fourth elastic member, and wherein the elastic force of the fourth elastic member is lower than that of the second elastic member.

2. An object conveying device according to claim 1, wherein the conveyed object adsorbing block holds the inner peripheral portion of the conveyed object at a position projecting the in relation to a conveyed object holding portion of the tray in the direction of the conveyed object, in the range of 0.8 mm to 1.3 mm.

3. An object conveying device according to claim 1, wherein the conveyed object adsorbing block holds the inner peripheral portion of the conveyed object at a position projecting the in relation to a conveyed object holding portion of the tray in the direction of the conveyed object, in the range of 1.0 mm to 1.1 mm.

4. An object conveying device according to claim 1, further comprising a fifth elastic member that inhibits the common plate from hanging down.

5. An object conveying device according to claim 4, wherein the fifth elastic member is supported by the support portion, and wherein the fifth elastic member holds the lower portion of the common plate.

6. An object conveying device according to claim 1, wherein the conveyed object is a stamper used for forming pits on an optical disk substrate.

* * * * *